United States Patent [19]

O'Neill

[11] Patent Number: 4,719,904
[45] Date of Patent: Jan. 19, 1988

[54] SOLAR THERMAL RECEIVER

[75] Inventor: Mark J. O'Neill, Richardson, Tex.

[73] Assignee: Entech, Inc., DFW Airport, Tex.

[21] Appl. No.: 887,931

[22] Filed: Jul. 22, 1986

Related U.S. Application Data

[62] Division of Ser. No. 701,308, Feb. 13, 1985, Pat. No. 4,672,949.

[51] Int. Cl.$^4$ .............................................. F24J 2/08
[52] U.S. Cl. .................................. 126/440; 126/441; 126/449
[58] Field of Search ............... 126/440, 446, 449, 901, 126/441; 350/1.1, 166

[56] References Cited

U.S. PATENT DOCUMENTS

| | | |
|---|---|---|
| 3,991,741 | 11/1976 | Northrup, Jr. et al. . |
| 4,069,812 | 1/1978 | O'Neill . |
| 4,082,413 | 4/1978 | Austin et al. ................... 126/901 X |
| 4,108,540 | 8/1978 | Anderson et al. ............. 126/440 X |
| 4,114,685 | 9/1978 | Schwartz et al. ................... 126/440 |
| 4,116,223 | 9/1978 | Vasilantone . |
| 4,122,239 | 10/1978 | Riboulet et al. ................... 126/901 |
| 4,148,297 | 4/1979 | Sherman, Jr. . |
| 4,148,298 | 4/1979 | Sherman, Jr. . |
| 4,148,299 | 4/1979 | Sherman, Jr. . |
| 4,299,201 | 11/1981 | Tsubota . |
| 4,300,538 | 11/1981 | Uroshevich . |
| 4,307,709 | 12/1981 | Sletten et al. ..................... 126/440 |
| 4,318,393 | 3/1982 | Goldstein . |
| 4,333,444 | 6/1982 | Sell et al. . |
| 4,337,758 | 7/1982 | Meinel et al. . |
| 4,426,996 | 1/1984 | Ure et al. . |
| 4,474,169 | 10/1984 | Steutermann . |

FOREIGN PATENT DOCUMENTS 555420 6/1923 France .
2429976 2/1980 France .

Primary Examiner—Randall L. Green
Attorney, Agent, or Firm—Harold E. Meier

[57] ABSTRACT

A solar thermal energy collector includes a thermal receiver for receiving thermal energy from incident solar radiation and converting that energy, with minimum heat loss, into thermal energy transferred to and carried by a thermal fluid in a copper conductor. The copper tube is placed within a lower aluminum extrusion and may be secured thereto with a metal-filled silicone adhesive. The adhesive also acts as a heat-transfer device. The lower aluminum extrusion rests upon a foundation of isocyanurate urethane insulation which in turn rests upon the lower portion of a solar collector so that the central axis of the thermal fluid conducting tube lies along the axis of concentration of received solar energy. An upper aluminum extrusion is placed on top of the upper half of the copper tube and secured thereto with metal-filled silicone adhesive. The top surface of the upper aluminum extrusion is painted black and has a triangular-faceted surface. The faceted top surface of the upper aluminum extrusion is configured such that the triangular prisms run along an axis parallel to the central axis of the thermal fluid tube. A clear silicone layer is placed on top of the upper aluminum extrusion with its lower surface interlocked with the triangular faceted top surface of the upper aluminum extrusion. The clear silicone layer has a prismatic upper surface with the longitudinal axes of the prisms being arranged perpendicularly to the longitudinal axes of the facets along the top surface of the upper aluminum extrusion.

8 Claims, 2 Drawing Figures

SOLAR THERMAL RECEIVER

This is a division of application Ser. No. 701,308 filed Feb. 13, 1985, now U.S. Pat. No. 4,672,949.

FIELD OF THE INVENTION

The present invention relates generally to solar energy collectors and more specifically to an improved thermal receiver for use in solar energy collectors.

BACKGROUND OF THE INVENTION

In the past, solar energy collectors, such as the one shown in the U.S. Pat. No. 4,069,812, which is included herein by reference, have provided a very effective and efficient means of converting solar energy into both useful thermal energy by transferring heat to a working fluid and/or useful electrical energy by means of solar cells. As the state of the art advances in solar energy collection, new and more efficient methods of heat collection and solar conversion are constantly being sought. Generally, improved collection systems have either increased the efficiency of the optical system for transforming light rays into usable energy, or improved tracking systems for tracking the sun, or improved thermal systems for collecting and retaining as much heat by a solar receiver as possible. The present invention is primarily concerned with the more efficient collection and the retention of thermal solar energy by providing an improved thermal energy receiver for use within a solar collector device.

Thermal inefficiencies in solar collectors can result from many causes. For example, while solar energy may be efficiently collected and focused upon a thermal receiver, much of that energy may subsequently be lost to the environment surrounding the receiver by radiative, convective and conductive heat transfer, since the receiver will normally operate at a much higher temperature than the environment. Additionally, reflection losses are normally experienced at the black-coated receiver and at the surfaces of transparent covers over the receiver. Even when the solar receiver or absorber is black-coated, reflection losses still occur, albeit to a lesser extent. Moreover, prior attempts to alleviate heat losses in solar thermal receivers have more often than not resulted in a more expensive product which is sometimes deficient in other respects. For example, in order to reduce radiative heat losses, some receivers have utilized black chrome selective coatings which are less durable and more expensive than low-cost black paint.

SUMMARY OF THE INVENTION

An improved solar energy thermal receiver is hereinafter described which provides significantly increased efficiencies in transforming solar radiation into useful heat transported by a thermal fluid. A thermal fluid-conducting copper (or other metal) tube is placed upon a lower aluminum extrusion. A metal-filled silicone (or other thermally conductive) adhesive may be placed between the tube and the extrusion. The lower aluminum extrusion rests upon a pre-formed volume of isocyanurate urethane (or other low conductivity material) insulation which fills the space between the lower aluminum extrusion and the solar collector housing. An upper aluminum extrusion is secured to the upper half of the copper tube and includes a black painted, triangular-faceted upper surface. A metal-filled silicone (or other thermally conductive) adhesive is placed between the copper tube and the extrusion. A clear silicone (or other transparent low conductivity material) layer with a prismatic upper surface and a triangular-faceted lower surface interlocking with the top surface of the upper aluminum extrusion, is placed on top of the upper aluminum extrusion. The improved thermal receiver construction disclosed herein provides a less expensive and more efficient thermal energy receiver which dramatically reduces heat loss from the receiver to the environment, significantly reduces the front surface reflection loss of the receiver, and minimizes reflection losses from the black-painted absorber.

BRIEF DESCRIPTION OF THE DRAWING

A better understanding of the present invention may be had from the following detailed description, when read in connection with the accompanying drawings, in which.

DETAILED DESCRIPTION OF THE PREFERRED EMBODIMENT

Figure 1:
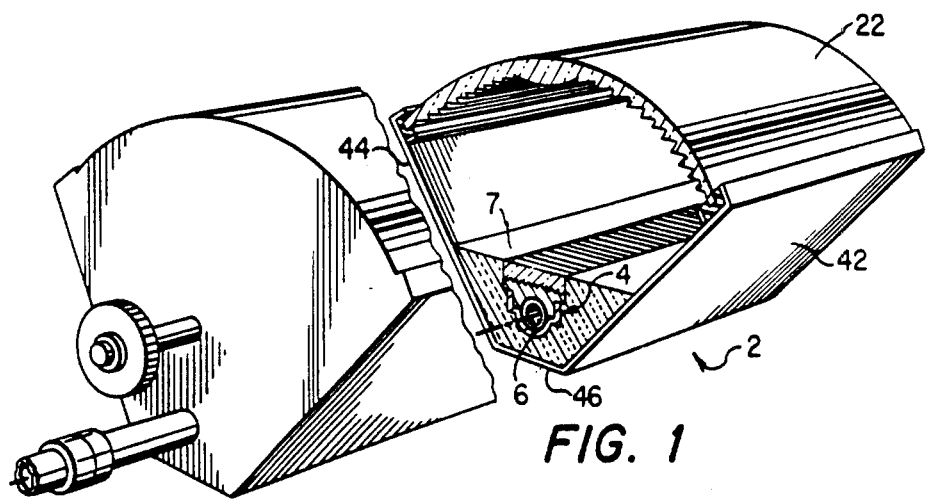
FIG. 1 is a cross-sectional view of the thermal collector and receiver of the present invention.

Referring in detail to FIG. 1, there is shown a thermal solar collector 2 similar to the collector disclosed in the above-referenced U.S. Pat. No. 4,069,812, including collector housing walls 42, 44 and 46 and a linear Fresnel lens 22 supported by the walls 42, 44 and 46. A pre-formed insulation material 7 is supported by the walls 42, 44 and 46 and provides a space into which a thermal receiver device 4 is placed. The collector 2 is arranged to focus incident solar radiation along a focal axis 6 which extends along the longitudinal axis of the collector 2.

Figure 2:
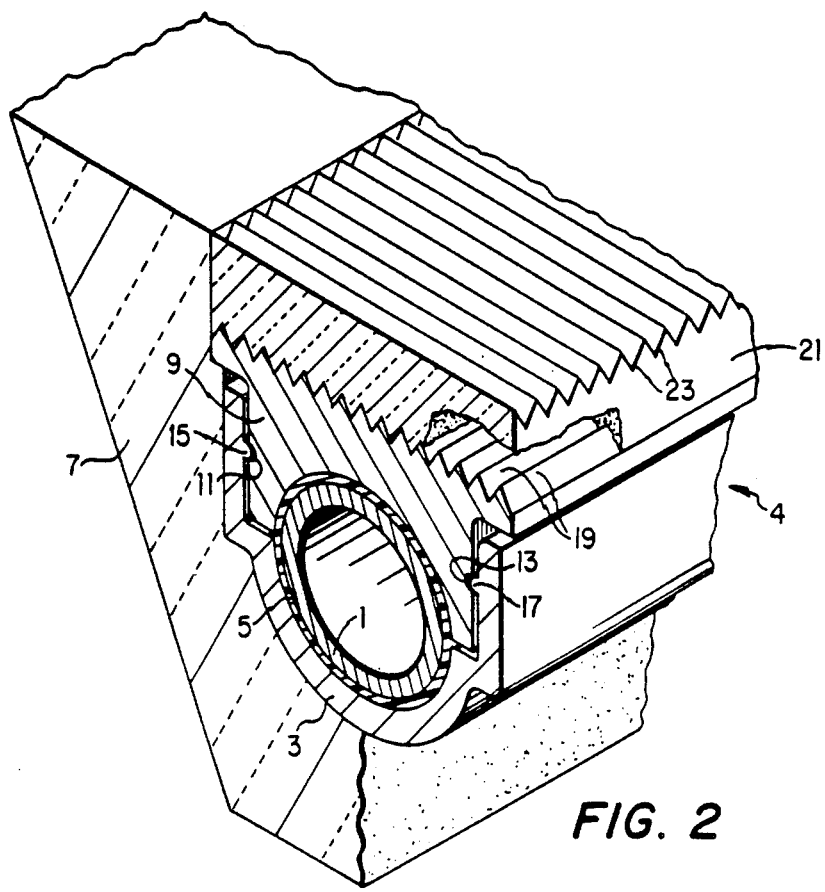
FIG. 2 is a cut-away, cross-sectional view showing the details of the thermal receiver.

In FIG. 2, a copper (or other suitable metal) tube 1 for transporting a heat exchange medium is disposed along the focal axis 6. The tube 1 is placed within a lower aluminum extrusion 3 and connected thereto with a metal-filled silicone adhesive 5. The lower aluminum extrusion 3 rests upon a layer of isocyanurate urethane (or other suitable low conductivity material) insulation 7 which fills the volume between the lower aluminum extrusion 3 and the housing of a solar collector such as the housing walls 42, 44 and 46 of the U.S. Pat. No. 4,069,812.

An upper aluminum extrusion 9 is constructed to be placed upon the top of the copper tube 1. In the present example, the upper aluminum extrusion includes detents 11 and 13 for receiving corresponding bosses 15 and 17 of a lower aluminum extrusion or support structure 3. The upper extrusion 9 includes a black-painted, triangular-faceted top surface 19. The peaks and valleys of the faceted top surface 19 are extended along the top surface of the upper extrusion 9 and run parallel to the longitudinal axis of the collector 2.

A clear silicone (or other transparent material with low thermal conductivity) layer 21 has its lower surface faceted to correspond to and engage with the faceted upper surface 19 of the upper aluminum extrusion 9. The silicone layer 21 includes a prismatic upper surface 23 with the longitudinal axes of the prisms running across the collector, i.e. perpendicularly to the longitudinal axes of the triangular facets engaging the lower surface of the silicone layer 21 and the upper surface of the upper aluminum extrusion 9.

The thick layer of optically clear silicone polymer 21 above the metal absorbing surface of the top aluminum extrusion 9 transmits most of the concentrated incident sunlight (coming from the linear Fresnel lens concentrator 22) to the black-painted aluminum absorbing surface 19, and dramatically reduces heat loss to the environment. The heat loss reduction is due to the very low thermal conductivity of the silicone material (about 0.1 BTU/HR-FT-DEG.F at room temperature), combined with its relatively large thickness (about 0.5 inch). It is noted that silicone polymer is opaque in the infrared portion of the spectrum, and effectively blocks thermal radiation emissions from the metal absorbing surface 19. Thus, the dominant heat loss mechanism is simple conduction, which can be controlled and optimized by the proper choice of silicone layer thickness. Based on measured optical properties, the silicone layer 21 only absorbs about 12% of the incident sunlight per one-half inch of silicone thickness, and about two-thirds of this absorbed sunlight is thermally conducted to the receiver after absorption. Thus, the net energy throughput efficiency of a 0.5 inch thick layer of the silicone is about 96% thereby allowing the receiver to have an excellent optical efficiency.

The prismatic structure on the upper (exposed) surface of the silicone layer 21 can be configured as simple equilateral triangles in cross-section. The prisms effectively eliminate the front surface reflection loss normally experienced with receiver glazing. Rays of light reflected from the external surface of one prism are transmitted directly to the adjacent prism and proceed directly to the absorbing surface 19 of the top aluminum extrusion 9. Thus the prismatic outer surface is an excellent, yet simple, anti-reflection device. The prisms are easily molded directly into the silicone material.

The triangular-faceted surface 19 on the metal absorber or top aluminum extrusion 9 is painted with a black paint to minimize reflection losses from the absorber 9. The facets 19 can be simple equilateral triangles extruded into the metal absorber 9. Solar rays reflected from the black-painted surface of one facet, re-impinge onto the adjacent facet, thereby minimizing reflection losses. For example, if a paint with only a 90% absorptance were used on the faceted absorber surface, 10% of the incidence sunlight would be reflected by each facet onto the adjacent facet, which in turn, would absorb 9% of the reflected 10%. Thus, the net absorptance of the faceted surface would be 99% for a poorly performing 90% paint. Since the triangular facets can be manufactured by direct profile extrusion of aluminum, no added cost will be incurred. Moreover, low cost black paint can be used in place of expensive, less durable black chrome selective coatings with no loss in performance because of the elimination of the thermal radiation loss from the receiver by the infrared-absorbing silicone layer 21.

The exemplary embodiment includes corrosion-resistant copper (or steel) tubing for the heat exchange flow passage 1, while using lower-cost aluminum extrusions 3 and 9 to provide the relatively complex receiver structure. Either alumina-filled or metal-filled silicone adhesives 5 are used to bond the copper tube 1 to the upper aluminum extrusion 9 with excellent thermal performance results. The metal-filled silicone adhesive 5 acts as a thermal conductor to minimize the temperature gradient between the upper aluminum extrusion and the copper tube 1. The metal-filled silicone adhesive 5 may also be placed between the copper tube 1 and the lower aluminum extrusion 3.

In the present example, the silicone layer 21 was formed with the General Electric Silicone RTV-615. Also in the exemplary embodiment, the following base line dimensions were implemented for the new thermal receiver: Silicone layer 21 thickness—0.5 inch; Silicone layer 21 width—1.6 inches; Receiver tube 1 diameter—1.0 inch; and isocyanurate insulation 7 thickness—1.0 inch (nominal). Also, in the present example, the metal-filled silicone adhesive 5 was used both between the copper tube 1 and the upper or top aluminum extrusion 9. In the present example, the collector 2 utilizes a linear Fresnel lens 22 which is 36 inches wide in aperture dimension.

The embodiments of the present invention in which an exclusive property or privilege is claimed are defined as follows:

1. A radiant energy collector including a housing for supporting means for focusing along a focal axis of the collector incoming radiation onto a thermal energy receiver, the housing supporting the means for focusing in a position to receive the incoming radiation and also supporting along the focal axis the thermal energy receiver, the thermal energy receiver comprising:

support means mounted within said housing generally along the focal axis of the collector;

a conduit positioned in the support means in a position extending along the longitudinal axis;

an energy absorber in thermal contact with said conduit and positioned between said means for focusing and said conduit, said energy absorber have a black surface exposed to the means for focusing;

a dielectric layer of a thermally insulating material transparent to incoming radiation and in thermal contact with the black surface of the energy absorber and positioned between the means for focusing and said energy absorber to receive the focused radiation and transmit such radiation to said absorber, said layer having a thickness between said means for focusing and said energy absorber greater than several wavelengths of the incoming radiation to minimize thermal losses from the absorber.

2. The radiant energy collector as described in claim 1 wherein the dielectric layer has a faceted surface facing said means for focusing.

3. The radiant energy collector as described in claim 1 wherein said energy absorber has a faceted surface in thermal contact with said dielectric layer.

4. The radiant energy collector as described in claim 1 wherein the dielectric layer is composed of a silicone polymer.

5. A radiant energy collector including a housing for supporting means for focusing along a focal axis of the collector incoming radiation onto a thermal energy receiver, the housing supporting the means for focusing in a position to receive the incoming radiation and also supporting along the focal axis the thermal energy receiver, the thermal energy receiver comprising:

support means mounted within the housing in a position substantially aligned with the focal axis;

a fluid conduit positioned in the support means along the focal axis of the collector;

an energy absorber in thermal contact with said conduit and positioned between said means for focusing and said conduit, said energy absorber having a black surface exposed to the means for focusing; and a dielectric layer of a thermally insulating material transparent to incoming radiation and in thermal contact with the black surface of the energy absorber and positioned between the means for focusing and said energy absorber to receive the focused radiation and transmit such radiation to said absorber, said layer of a thermally insulating material having a high transmittance for incoming radiation, a high absorptance for infrared radiation, a low thermal conductivity, and having a thickness between said means for focusing and said energy absorber to minimize thermal losses from the absorber.

6. The thermal energy receiver as set forth in claim 5, wherein said dielectric layer has a faceted surface facing said means for focusing.

7. The thermal energy receiver as set forth in claim 5, wherein said radiation-absorbing element has a faceted surface in thermal contact with said dielectric layer.

8. The thermal energy receiver as set forth in claim 5, wherein said dielectric layer is composed of a silicone polymer.

* * * * *